United States Patent [19]

Harshbarger

[11] Patent Number: 4,568,975
[45] Date of Patent: Feb. 4, 1986

[54] METHOD FOR MEASURING THE GRAY SCALE CHARACTERISTICS OF A CRT DISPLAY

[75] Inventor: John H. Harshbarger, Xenia, Ohio

[73] Assignee: Visual Information Institute, Inc., Xenia, Ohio

[21] Appl. No.: 637,150

[22] Filed: Aug. 2, 1984

[51] Int. Cl.$^4$ .............................................. H04N 17/04
[52] U.S. Cl. ...................................... 358/139; 324/404
[58] Field of Search ................... 358/139, 10; 324/404

[56] References Cited

U.S. PATENT DOCUMENTS

| 4,093,960 | 6/1978 | Estes | 358/139 |
| 4,536,792 | 8/1985 | Harshbarger | 358/139 |

OTHER PUBLICATIONS

Television Test Patterns From High Technology Television Visual Information Institute, Inc. 1982.

*Primary Examiner*—Howard W. Britton
*Attorney, Agent, or Firm*—Albert L. Jeffers; Anthony Niewyk

[57] ABSTRACT

A method and apparatus for measuring the Gray Scale characteristics of a CRT display wherein a luminance meter surveys a ten percent portion of the total surface area of the screen of the CRT display screen. The luminance meter is positioned far enough from the screen so that the cone surveyed by the luminance meter will intersect the plane of the screen to cause ten percent of the screen surface area to be surveyed. A special test pattern is generated for display on the CRT screen whereby a surveyed area is provided having a sufficiently large surface area and being of uniform brightness. The test pattern also provides for an additional screen area equal in size to the surveyed area. The average picture level for the surveyed area and the non-surveyed area is maintained at fifty percent of peak picture level while the brightness of the surveyed area is varied in incremental steps through the Gray Scale. The test pattern also provides for another portion of the screen having three contiguous areas having brightness levels of whiter than black, black, and blacker than black, respectively. An additional area of the test pattern is provided which together with the black areas provide for a fifty percent average picture level. The APL for the entire screen is maintained at fifty percent. As the surveyed area brightness level is varied through the Gray Scale, the luminance meter measures the brightness whereby the Gray Scale performance of the CRT display can be measured. The black areas of the screen are monitored visually to ensure that the black level setting for the CRT display is proper throughout the test.

16 Claims, 9 Drawing Figures

METHOD FOR MEASURING THE GRAY SCALE CHARACTERISTICS OF A CRT DISPLAY

BACKGROUND OF THE INVENTION

The present invention relates to a method for testing CRT displays, such as closed circuit television monitors, computer displays and other precision CRT displays, and relates specifically to a method for testing the brightness levels of the raster scan display. In CRT displays of this type it is possible that with time the components of the apparatus will age and the brightness performance of the display will change. When such CRT displays are used in precision equipment, it is necessary to periodically measure the brightness levels of such precision CRT displays to confirm the operation and verify performance to be that typical for the particular type of equipment.

Traditionally, brightness levels of CRT displays have been difficult to measure accurately due to limitations of the instrumentation as well as the methods employed for measuring. The instruments commonly used for measuring brightness levels of a CRT display are luminance meters which are also known as photometers. Such luminance meters are actually spot brightness meters which employ photocells and are extremely precise. Typically, their optical systems are intended to survey a cone of approximately one degree of viewing angle.

The difficulty with measuring the brightness levels of a CRT display with such a spot brightness meter is that the CRT display is formed by the scanning of the screen by an electron beam. As the electron beam scans the screen, the electrons of the beam will impact the spot on the screen and will excite the screen phosphors of that spot and thus, as the spot scans the screen a display having areas of varying brightness is produced. However, the bright spot produced at the point of the incidence of the scanning beam with the screen, has an instantaneous brightness that is very high as compared to the average brightness of the screen. Thus, as the scanning spot passes the area being surveyed by the luminance meter a transient will result in the output reading of the luminance meter which distorts and causes inaccuracies in the brightness measurement. It is therefore desired that the inaccuracies caused by the electron beam scanning spot be eliminated and that the average brightness of the screen be measured rather than the instantaneous brightness caused by spot scanning with an electron beam. Therefore, it is desired that a relatively large area of the screen be surveyed to obtain an average brightness reading.

Another problem in the traditional brightness level testing of a CRT is that the traditional display pattern used for measuring brightness is a bar pattern wherein the screen is divided into ten vertical bars each having a different degree of brightness. This pattern is generally referred to as the Gray Scale pattern. The ten vertical bars each occupy ten percent of the screen width. Since the luminance meter should only view one bar at a time, and since the luminance meter views a circular area, the area surveyed can only be a relatively small circular area having a diameter of one tenth of the screen width. This is too small an area to give accurate readings due to the bright scanning spot passing the surveyed area. As pointed out above, it is desired to survey a substantial portion of the screen so that the average brightness of that portion is measured. If a Gray Scale pattern is used, and a large area is surveyed, the area would contain bars of several different brightness levels and would therefore be incapable of providing meaningful test data.

A further problem in testing brightness levels of a CRT display is that, as the brightness level of the area surveyed by the luminance meter is varied from high to low, the current drawn from the high voltage supply by the electron beam will change as different current levels are necessary to generate different brightness levels. Since normally the high voltage supply of a CRT is limited in the amount of power it can supply, this change in current will affect the voltage generated by the supply, which in turn will affect the remaining circuitry of the cathode ray tube and generate a distorted display which cannot be calibrated accurately. As more current is drawn from the high voltage supply by the electron beam in generating a bright display image having a relatively large amount of high illumination image area compared to the amount of background area, the voltage will drop in the high voltage supply. When this voltage drops, it causes a shift in the magnetic field of the deflection control system for the electron beam thereby affecting centering of the image, and it may also cause a difference in the deflection angle, therefore affecting the size of the image. For example, consider an image generated on the screen, such as a technical drawing wherein the lines of the drawing are highly illuminated and occupy a relatively low percentage of the screen and the background is at a low or black illumination level. If the polarity of the image is reversed, wherein the background is at a high illumination level and the lines of the drawing at a low illumination level, there will likely be a shift in the position of the image and also a possible change in its size. This is because when reversing the polarity, much more current will be drawn by the electron beam thereby causing a voltage drop in the high voltage supply. This change in voltage effects the strength of the beam control magnetic field thereby resulting in the displacement of the image on the screen. This phenomenon can result in inaccuracies in the image displayed which can be quite significant depending upon the application. It is therefore desired that the current drawn from the high voltage supply be relatively constant so that no distortion will occur in the display. Therefore, it is desired that the average picture level or APL of the CRT display be maintained a constant proportion of the peak picture level. By holding the APL constant the current drawn from the voltage supply will remain constant, the measurements taken will be accurate, and proper calibration can result.

SUMMARY OF THE INVENTION

The method of the present invention enables the accurate measurement of the brightness levels of a cathode ray tube display. In one form of the invention, a conventional luminance meter is used to survey at least a ten percent area of the display screen, such area being of uniform brightness. A special display test pattern is generated having at least a ten percent area thereof of uniform brightness which ten percent is all surveyed by the luminance meter. The brightness levels of this area are varied in a series of steps preferably from white to black. In the preferred embodiment the number of steps selected is ten. The display pattern also has a nonsurveyed area thereof at a brightness level different from that of the surveyed area. By simultaneously varying the brightness levels of the surveyed area and the non-surveyed areas the APL can be maintained constant. Thus, as the surveyed area decreases in brightness the nonsurveyed area will be increased in brightness so that the APL is maintained at a constant value, thereby maintaining constant the current drawn from the voltage supply.

In the preferred embodiment two display patterns are disclosed, one of which is a V-stripe pattern consisting of three vertical bars and wherein the central bar is surveyed by the luminance meter. The second pattern disclosed is a Brightness pattern having a central window portion for surveying by the luminance meter and additionally having selected portions thereof at black levels which can be visually monitored by the operator continuously throughout the test. Additional nonsurveyed areas are also provided which are varied in brightness to enable the APL to be maintained at a constant value. The black areas are used for calibration purposes so that the operator can continuously visually monitor these areas of constant brightness to ensure that the calibration of the test equipment at the black level is proper.

The present invention, in accordance with one aspect thereof, comprises a method for measuring the brightness levels of a raster scan display device comprising the following steps:

1. Generating a pattern on the display screen of a cathode ray tube by scanning the screen with an electron beam, the pattern comprising a plurality of areas at a plurality of brightness levels, each area having a uniform brightness level, and the average picture level for generating the pattern being of a predetermined magnitude.

2. Surveying a portion of the screen area with a luminance meter, the portion lying entirely within one of the pattern areas and being large enough to cause the luminance meter to read the average brightness of that portion.

3. Varying the brightness level of the surveyed screen portion in a series of steps while simultaneously varying the brightness levels of the remaining plurality of areas to maintain the average picture level at the predetermined value.

4. Measuring the brightness of the surveyed screen portion at the various brightness levels.

In accordance with another aspect of the present invention there is provided a method for measuring the brightness level performance of a raster scan display device having a display screen, comprising:

1. Generating a pattern on the display screen by scanning the screen with an electron beam, the pattern comprising a first portion sufficiently large to contain a circle comprehending a surface area equal to at least ten percent of the display screen surface area, a second portion having a surface area equal to the surface area of the first portion, a third portion containing contiguous areas at black, whiter than black and blacker than black brightness levels and further containing a white area, the third portion having an average picture level of substantially fifty percent of peak picture level.

2. Varying the brightness level of the first portion in a series of equal size increments through the entire brightness range.

3. Maintaining the average picture level for the composite first and second portions at substantially fifty percent of peak picture level by varying the brightness level of the second portion corresponding to the incremental changes in the brightness levels of the first portion.

4. Positioning a luminance meter to survey at least a ten percent display screen area part of said first portion.

5. Measuring the brightness of the surveyed screen portion for the various brightness levels.

It is an object of the present invention to provide a method and apparatus for testing the brightness levels of a CRT display accurately and quickly.

It is a further object of the present invvention to provide a technique for testing the brightness levels of a CRT display without the transient spot scanning effects of the electron beam or effects on CRT performance due to changes in current drawn from the high voltage source of supply.

It is still a further object of the invention to measure the brightness levels in a CRT display accurately and quickly with a conventional luminance spot brightness meter.

BRIEF DESCRIPTION OF THE DRAWINGS

The aforementioned features and advantages of the present invention and the manner of attaining them will become more apparent, and the invention will be better understood by reference to the following description of a preferred embodiment of the invention taken in conjunction with the accompanying drawings wherein.

DETAILED DESCRIPTION OF A PREFERRED EMBODIMENT

Figure 1:
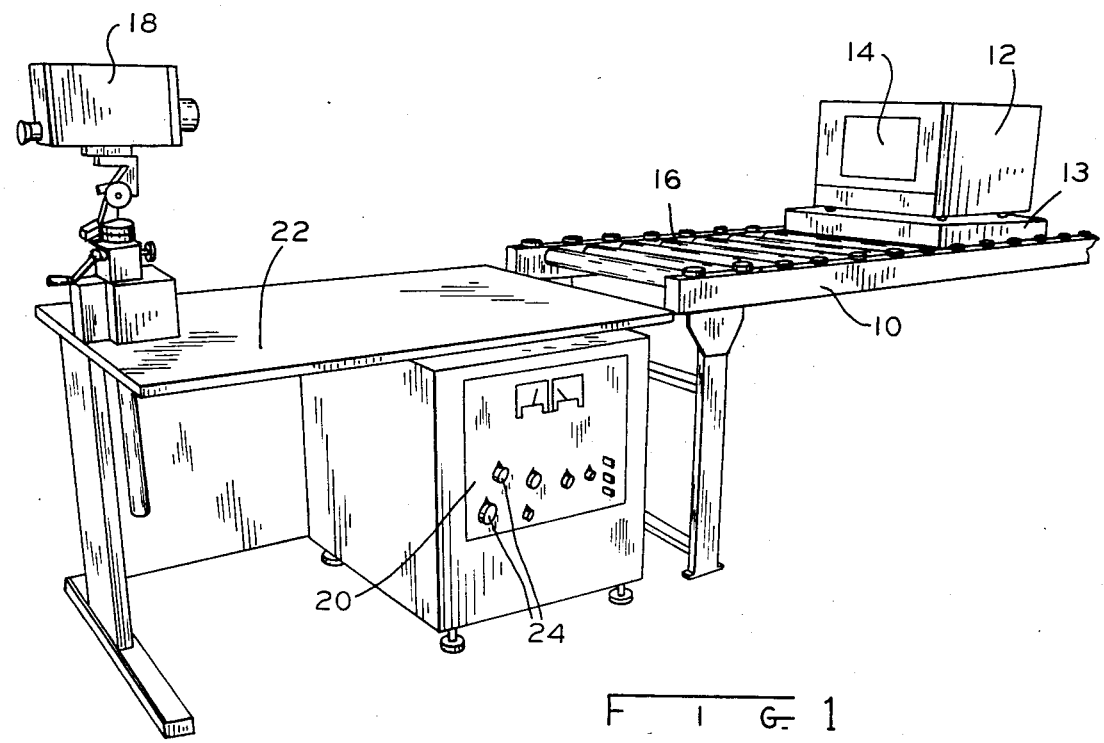
FIG. 1 is a perspective view of the test apparatus.

FIG. 1 shows a display test stand for testing the brightness levels of a CRT display and includes a conveyor 10 having conveyor rollers thereon indicated at 16, upon which is placed a platform 13 for supporting a CRT display 12 having display screen 14. The platform 13 is moveable along conveyor 10 to adjust the distance of screen 14 from a luminance meter 18 which is supported by a support platform 22. A test pattern generator 20 is shown having controls 24 for controlling the display on the screen 14 of CRT 12.

Luminance meter 18 is a photometer such as are commercially available. Such photometers are typically spot brightness meters wherein the sensing elements are photo cells for very precisely measuring the brightness of an object being measured. Such spot brightness meters typically have a viewing angle of one degree so that a one degree cone is surveyed. One example of such a photometer is a Spectra Model PR1500 manufactured by Photo Research Div. Kallmorgan Corp. of Burbank, CA. By placing the luminance meter further away from the object being viewed a larger surface area will be surveyed. As the platform upon which the CRT display 12 is supported is moved further away from the luminance meter, a larger area of the screen 14 can be surveyed by the luminance meter 18.

It is well known that a CRT display is generated by means of an electron beam which scans the screen of the display in horizontal lines. As the electrons from the electron beam impinge upon the phosphors of the screen, the phosphors will light up and decay with time. Thus, the display image is "painted" by a spot of light moving horizontally across the screen repeatedly, all the while drifting down much like the eye scanning a page while reading. When the surface area is completely surveyed the light spot retraces to the top and repeats the process. There will be some decay in the brightness of the phosphors between the time it was scanned and the time it is rescanned by the electron beam. By scanning the CRT screen at a rapid enough rate, typically one-sixtieth of a second, an acceptable image is generated.

As the spot scanning the CRT display screen and generated by the scanning electron beam passes the area being surveyed by the luminance meter 18 and instantaneous high brightness level is generated which would be detected by the luminance meter if the area surveyed by the luminance meter were small. In testing the brightness of the CRT display screen it is desired to measure the average brightness of the screen. For that reason it is important that the luminance meter surveys a large enough area of the screen so that the instantaneous bright spot caused by the scanning electron beam will not saturate the photo sensor of the luminance meter as the spot passes the area being surveyed. Typically, manufacturers of luminance meters recommend that the area surveyed by the luminance meter to ensure accurate reading of average brightness be ten percent or more of the total display area of the CRT display. By surveying an area at least equal to ten percent of the total display area the possibility of saturating the luminance meter photo cell will be avoided.

Thus, platform 13 is adjusted so that the area of the screen surveyed by luminance meter 18 will be at least ten percent of the total screen area. Since the area being surveyed by the luminance meter is circular and the typical CRT display is rectangular it can be calculated that the diameter of the circle being surveyed must be four-tenths of the height of the display in order for the area surveyed to be ten percent of the screen area.

Figure 2:
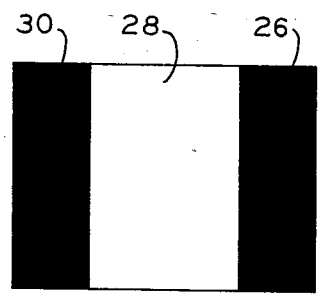
FIG. 2 is a diagrammatic view of a CRT display screen with a V stripe pattern at the white level of brightness.

The area surveyed by the luminance meter should be of uniform brightness and therefore a test pattern should be displayed on the CRT screen which has an area of uniform brightness having a vertical and horizontal dimension at least equal to four-tenths of the height of the CRT display screen. One such test pattern is shown in FIG. 2. This pattern is referred to as the vertical stripe or V stripe pattern having a central stripe of one uniform brightness. The width of the stripe comprises fifty percent of the width of the screen and the two other stripes on either side of the central stripe are each twenty-five percent of the width of the television screen. The two side stripes are of a brightness different than the center stripe as explained hereinafter. The V-stripe pattern is generated by the test pattern generator 20 which may be a signal source Model 2501 manufactured and sold by Visual Information Institute Inc. of Xenia, Ohio.

Figure 9:
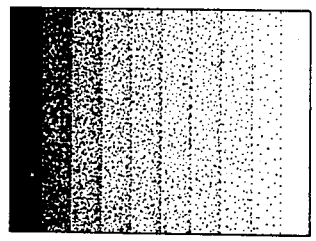
FIG. 9 is a diagrammatic view of a CRT display screen with a Gray Scale pattern.

Referring now to FIG. 9 the typical prior art Gray Scale test pattern is shown which is commonly used in testing the brightness levels of a CRT screen. Typically, such a pattern consists of ten bars each having a different brightness and varying from white to black. It can furthermore be seen that the width of the individual bars of this display are only one-tenth of the width of the screen. Therefore, this test pattern is unsuitable for the testing method because, to survey an area of uniform brightness, the luminance meter would need to be placed close enough to the screen to survey a circle having a diameter no greater than one-tenth of the width of the screen. This in turn would cause saturation of the sensor of the luminance meter by the scanning spot as it passes by the surveyed area, thus causing inaccurate measurements. The test pattern shown in FIG. 2, by its configuration, is suitable for accurate testing because of the large central area which can be surveyed by the luminance meter.

Referring now to FIG. 2 again, as the brightness of the central stripe 28 is varied from white to black, the input signal to the CRT must be varied accordingly. If the side areas 26 and 30 were to remain at a constant brightness level, the amount of current drawn from the high voltage source of the CRT display to generate the central stripe at varying brightness levels would also vary accordingly. Since the high voltage supply of the typical CRT is typically limited, as more current is drawn therefrom by the electron beam in generating a bright display image the voltage of the high voltage supply will drop. When this voltage drops, much of the circuitry of the CRT will be affected by the voltage drop and the performance of the CRT display screen will vary thereby causing inaccurate measurements by the luminance meter. To prevent this from happening the test pattern shown in FIG. 2 is designed to keep the average picture level, commonly referred to as APL, and therefore the current drawn from the high voltage supply, constant. Thus, by varying the brightness of areas 26 and 30 as the brightness of portion 28 is varied to keep the average picture level constant the voltage drawn from the high voltage supply is kept constant. By keeping the APL at fifty percent of peak picture level at all illumination levels of portion 28 accurate measurements are achieved.

Figure 6:
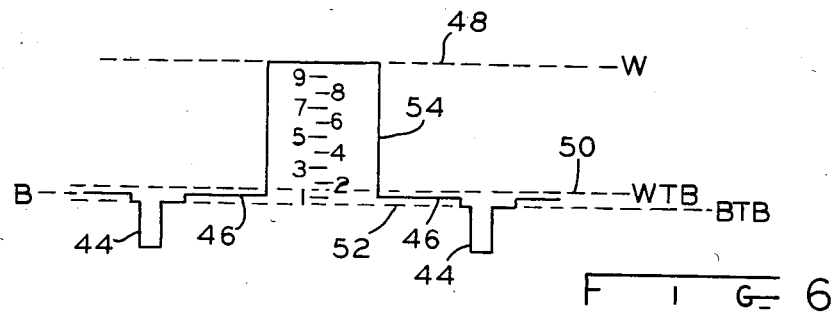
FIG. 6 is a horizontal rate video waveform for the V stripe pattern at the white level of brightness.

Referring now to FIG. 6 a horizontal rate video wave form is shown which will produce the pattern illustrated in FIG. 2. Synchronization pulses 44 are shown which mark the beginning and the end of a horizontal scan. Black level portions 46 are shown which generate the vertical bars 26 and 30. Pulse 54 is at the white level or lever ten of brightness and generates the central white portion 28 shown in FIG. 2.

Figure 3:
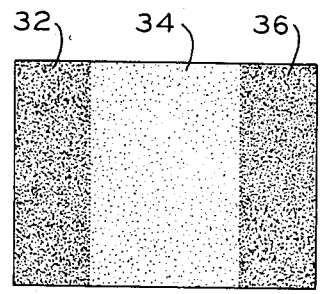
FIG. 3 is a diagrammatic view of a CRT display screen with a V stripe pattern at a gray level of brightness.
Figure 7:
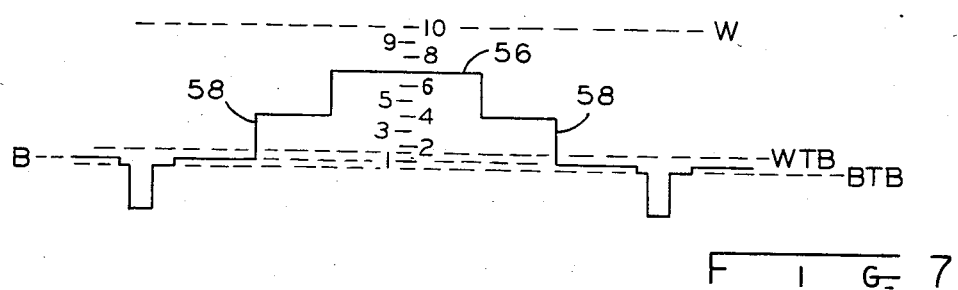
FIG. 7 is a horizontal rate video waveform for the V stripe pattern at the gray level of brightness.

By referring now to FIGS. 3 and 7, a V-stripe pattern at level seven of the gray scale is provided for the central portion 34 of FIG. 3. As indicated in FIG. 7 central pulse 56 is shown at the of a signal level to provide a light gray brightness of the central portion of the screen 34. Areas 32 and 36 are at a brightness level four indicated by numerals 58 in FIG. 7. The average picture level of the screen is kept at fifty percent by increasing the brightness of portions 32 and 36 while the brightness of portion 34 is reduced. The APL and current drop from the high voltage source therefore remains constant and accurate measurements can be made as explained hereinabove. Thus, the brightness of the central portion of the screen 34 in FIG. 3 can be varied in steps, here indicated as ten, while maintaining the APL at fifty percent. By providing an appropriate input signal as indicated in FIG. 7 and by measuring the brightness level provided by that input signal the CRT display can be tested for proper Gray Scale performance.

Figure 4:
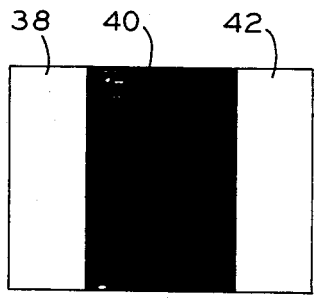
FIG. 4 is a diagrammatic view of a CRT display screen with a V stripe pattern at a black level of brightness.
Figure 8:
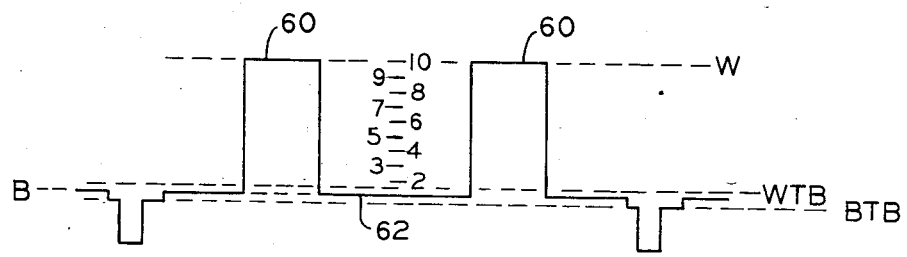
FIG. 8 is a horizontal rate video wave form for the V stripe pattern at the black level of brightness.

FIGS. 4 and 8 illustrate the generation of step one of the gray scale with a V stripe pattern. Thus, the central portion of the screen will be at the black level whereas the side portions of the screen will be at the white level thereby still ensuring that the APL for the entire screen will be fifty percent.

It should be understood that while ten levels of brightness are illustrated here the input signals to the CRT could be modified to provide any number of brightness levels desired for testing.

Figure 5:
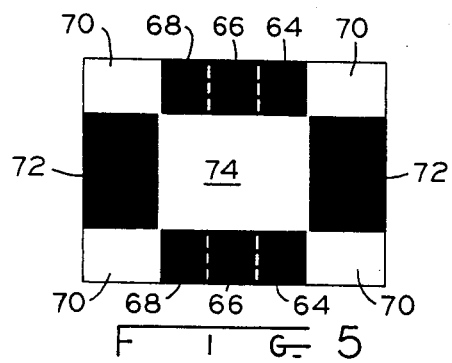
FIG. 5 is a diagrammatic view of a CRT display screen with a Brightness pattern at a white level of brightness.

For most accurate measurement of the Gray Scale it is desirable that the black level setting of the CRT display be monitored continuously so that, if there is any drift in the overall brightness setting of the CRT display, this can be detected immediately and the brightness setting adjusted accordingly. For this purpose an additional test pattern is shown in FIG. 5. The central area 74 is the area surveyed by the luminance meter and as indicated above should have a height and width of at least forty percent of the height of the screen. In addition areas 64 are provided which have a brightness level of the standard "blacker than black". The signal level for generating the "blacker than black" areas 64 is indicated in FIG. 6 as signal level 52. Adjacent areas 64 are standard "black" areas 66. The signal level to generate "black" areas 66 is indicated at 46 in FIG. 6. Adjacent the black areas 66 are areas 68 which are at a brightness level of standard "whiter than black". The signal level to produce areas 68 is indicated in FIG. 6 at numeral 50.

When the test pattern of FIG. 5 is used for testing the Gray Scale, the user continuously monitors portions 64,66 and 68 to visually ensure that the difference between the areas 64 and 66 is not discernible because, to the human eye, "black" and "blacker than black" levels would appear the same. Areas 64, 66 and 68 can also be used to calibrate the equipment. At the same time the user monitors the difference between areas 66 and 68 because, to the human eye, there is a discernible difference between the "whiter than black" and the "black" brightness levels. Thus, as the luminance meter measures the brightness of portion 74 the user continuously monitors the three portions 64,66 and 68 to ensure that a discernible difference exists between areas 66 and 68 but that no discernible difference exists between areas 64 and 66. Areas 70 are maintained at an appropriate signal level to ensure that the total APL of the horizontal strip along the top of the screen and the bottom of the screen is fifty percent. Areas 72 are varied in brightness to compensate for the changes in brightness of area 74 so that, as the brightness of area 74 is varied throughout the gray scale, the total APL of the screen will remain constant at fifty percent.

A typical Gray Scale calibration test using the Brightness pattern shown in FIG. 5 would proceed as follows: the CRT display would be placed upon platform 13 with the screen area 14 facing the luminance meter 18. The distance of the CRT display from the luminance meter would be adjusted to that the luminance meter surveys a 10 percent portion of the total display area. A photometer to display surface distance of 24 times the CRT display height is recommended. The circular portion of the display area surveyed would therefore comprise approximately 40 percent of the height of the CRT display. The luminance meter 18 is mounted on a tripod and is aligned so that the surveyed area lies completely within window area 74 of the Brightness pattern of FIG. 5. The display must be shielded from incident room light.

The first brightness level chosen for area 74 for the sake of illustration is the white level, or level ten on the signal level scale illustrated in FIGS. 6, 7 and 8. At the same time, the brightness of area 72 is automatically selected by the test pattern generator to be black so that the APL of combined areas 72 and 74 is 50 percent. Areas 66 are inspected visually to ensure that a discernable difference exists between the brightness of areas 64 and 66 and no difference is discernible between areas 68 and 66. Alternatively, area 66 could be scanned by the photometer to ensure proper brightness setting. The brightness of window area 74 is measured and set to specifications. The reading of the photometer is recorded for this first level of brightness of window area 74. The test pattern generator is now adjusted to provide the second brightness level for window area 74. Area 66 is again monitored visually or with the photometer to ensure proper brightness level setting and the reading of the photometer is again recorded. Similarly, the brightness of area 74 is adjusted in ten steps and the brightness of area 66 is monitored continuously for each step. The test pattern generator will automatically maintain the APL at 50 percent throughout the test. The reading of the luminance meter for each brightness level are compared to the input voltage producing that level of brightness to ensure that the CRT has been adjusted properly. If any discrepancies are detected, the CRT circuitry can be calibrated to ensure proper performance of the CRT display.

While this invention has been described as having a preferred embodiment, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A method for measuring the brightness levels of a raster scan display device comprising:
   generating a pattern on the display screen of a cathode ray tube by scanning said screen with an electron beam, said pattern comprising a plurality of areas at a plurality of brightness levels each area having a uniform brightness level, the average picture level for generating said pattern being of a predetermined magnitude;
   surveying a portion of the screen area with a luminance meter, said portion lying entirely within one of said pattern areas and being large enough to cause the luminance meter to read the average brightness of said portion;
   varying the brightness level of the surveyed screen portion in a series of steps while simultaneously varying the brightness levels of the remaining pattern areas to maintain the average picture level at said predetermined value; and
   measuring the brightness of the surveyed screen portion for the various brightness levels.

2. The method of claim 1 wherein the average picture level magnitude is maintained at 50 percent of the peak picture level.

3. The method of claim 1 wherein the surveyed screen portion is no less than ten percent of the total screen area.

4. The method of claim 1 wherein the surveyed screen portion is not less than ten percent and no greater than fifty percent.

5. The method of claim 1 wherein the pattern comprises three vertical stripes, the central stripe having one brightness level and the outside stripes having a second brightness level.

6. The method of claim 5 wherein the width of the central stripe comprises fifty percent of the width of screen, and the width of the outside stripes each comprises twenty-five percent of the width of the screen.

7. The method of claim 1 wherein the pattern comprises;
   a first area containing the surveyed portion;
   a second area having a black brightness level;
   a third area having a blacker than black brightness level;
   a fourth area having a whiter than black brightness level;
   said second area being adjacent both said third and fourth areas.

8. The method of claim 7 wherein a fifth area is provided having a white brightness level and wherein said second, third, fourth and fifth areas are proportioned to have a combined average picture level of said predetermined magnitude.

9. The method of claim 7 wherein the second, third and fourth areas are of equal size and are arranged in a horizontal strip.

10. The method of claim 7 wherein a fifth area is provided having a white brightness level and wherein said second, third, fourth and fifth areas are arranged in a horizontal strip along a periphery of the screen and are proportioned to have a combined average picture signal level of said predetermined magnitude.

11. The method of claim 1 wherein the pattern comprises a central screen portion having a first brightness level and arranged adjacent two portions one each adjacent a respective side of the screen having a second brightness level; two horizontal strips arranged respectively above and below said central portion, each comprising areas of black brightness level, blacker than black brightness level, whiter than black brightness level, and white brightness level.

12. The method of claim 11 wherein the two horizontal strips are proportioned to have an average picture level of said predetermined magnitude.

13. The method of claim 11 wherein the combined central and side portions are maintained at an average picture signal level of said predetermined magnitude.

14. The method of claim 1 wherein the portion of screen area surveyed by the luminance meter is determined by the distance between the display screen and the luminance meter.

15. The method of claim 1 wherein the varying brightness levels of the viewed screen area includes the white and black levels and the increments of brightness level change between the series of steps are of equal value.

16. A method for measuring the brightness level performance of a raster scan display device having a display screen, comprising:
   generating a pattern on the display screen by scanning said screen with an electron beam, said pattern comprising a first portion sufficiently large to contain a circle comprehending a surface area equal to at least ten percent of the display screen surface area, a second portion having a surface area equal to the surface area of said first portion, a third portion containing contiguous areas at black, whiter than black and blacker than black brightness levels and further containing a white area, said third portion having an average picture level of substantially fifty percent of peak picture level;
   varying the brightness level of said first portion in a series of equal sized increments through the entire brightness range;
   maintaining the average picture level for said composite first and second portions at substantially fifty percent of peak picture level by varying the brightness level of said second portion corresponding to the incremental changes in the brightness levels of said first portion;
   positioning a luminance meter to survey an area of said first portion of at least ten percent of the total display screen area;
   measuring the brightness of the surveyed screen area for the various brightness levels.

* * * * *